(12) United States Patent
Jain et al.

(10) Patent No.: US 10,409,896 B2
(45) Date of Patent: Sep. 10, 2019

(54) INTELLIGENT FONT REPLACEMENT OF MISSING GLYPHS

(71) Applicant: Adobe Inc., San Jose, CA (US)

(72) Inventors: Arihant Jain, Ghaziabad (IN); Vineet, Ghaziabad (IN); Aman Arora, New Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/887,404

(22) Filed: Feb. 2, 2018

(65) Prior Publication Data

US 2019/0243875 A1  Aug. 8, 2019

(51) Int. Cl.
*G06F 17/00* (2019.01)
*G06F 17/21* (2006.01)
*G06K 9/00* (2006.01)

(52) U.S. Cl.
CPC ....... *G06F 17/214* (2013.01); *G06K 9/00456* (2013.01); *G06K 9/00483* (2013.01)

(58) Field of Classification Search
CPC .................................................. G06F 17/214
See application file for complete search history.

(56) References Cited

U.S. PATENT DOCUMENTS

| 5,859,648 | A | * | 1/1999 | Moore | G06F 17/214 345/471 |
| 2006/0238787 | A1 | * | 10/2006 | Foehr | G06F 17/214 358/1.11 |
| 2008/0079730 | A1 | * | 4/2008 | Zhang | G06F 17/214 345/468 |
| 2008/0154911 | A1 | * | 6/2008 | Cheng | G06F 17/214 |
| 2009/0183069 | A1 | * | 7/2009 | Duggan | G06F 17/214 715/269 |
| 2016/0226976 | A1 | * | 8/2016 | Ciabarra, Jr. | H04L 67/1097 |

\* cited by examiner

*Primary Examiner* — Scott T Baderman
*Assistant Examiner* — Barbara M Level
(74) *Attorney, Agent, or Firm* — Brake Hughes Bellermann LLP

(57) ABSTRACT

Techniques are described for systems and computer-implemented methods that may be used to replace missing glyphs. The methods may include identifying a source font associated with each respective missing glyph in a document and extracting features pertaining to the source font for each respective missing glyph. The method may further include identifying a number of target fonts for each respective missing glyph based at least in part on the features extracted from the source font. The method may also include ranking the target fonts based on a respective target font having a similarity to one or more of the features. The method may include triggering for display in a user interface within the document and for each missing glyph, a subset of the ranked target fonts that are ranked highest and which include a character configured to replace each respective missing glyph in the document with a new glyph.

20 Claims, 13 Drawing Sheets

| ITEM   | COST |
|--------|------|
| Item 1 | ☒ 10.0 |
| Item 2 | ☒ 20.0 |
| Item 3 | ☒ 30.0 |
| Item 4 | ☒ 40.0 |
| Item 5 | ☒ 50.0 |

| ITEM   | COST |
|--------|------|
| Item 1 | Rp 10.0 |
| Item 2 | Rp 20.0 |
| Item 3 | Rp 30.0 |
| Item 4 | Rp 40.0 |
| Item 5 | Rp 50.0 |

500

512, 514, 516, 518, 520

522

524 ☒ Missing glyph replacement-Moefilter text-black
..em 2Rp 10.0Item 2Rp 20.0Item 3Rp 30.0 Item 4Rp 4...

526 ☐ Missing glyph replacement-Moefilter text-Italic
..em 2Rp 10.0Item 2Rp 20.0Item 3Rp 30.0 Item 4Rp 4...

FIG. 5B

| ITEM | COST | 500 |
|---|---|---|
| Item 1 | Rp 10.0 | |
| Item 2 | Rp 20.0 | |
| Item 3 | Rp 30.0 | |
| Item 4 | Rp 40.0 | |
| Item 5 | Rp 50.0 | |

530, 532, 534, 536, 538 → Rp

524

☐ Missing glyph replacement-Palatino-Bold
...em 2Rp 10.0Item 2Rp 20.0Item 3Rp 30.0 Item 4Rp 4...

☑ Missing glyph replacement-Moefilter text-Black
...em 2Rp 10.0Item 2Rp 20.0Item 3Rp 30.0 Item 4Rp 4...

Input: A document or a text frame having missing glyphs in any language.
Initialization:
vector<frameNumber,indexNumber> missingGlyphInfo; Contains information related to missing glyph i.e. frame number, index number.
vector<std::list> missingGlyphRepacedFontlist: A list containing a set of applicable fonts for each missing glyph in the scope
std::set missingGlyphReplacedFontList (Empty): List of all applicable fonts which are useful in replacing at least one missing glyph
Pseudo Code:
1. Start Algorithm
2. Let there be N frames in the document
3. Set frameNumber to 0
4. while(frameNumber<=N-1) perform step 5
    5. i. Set indexNumber to 0
    ii. Set numberofCharacter to Frame.CharCount();

*Start loop1:* i. while(indexNumber<= numberofCharacter-1) a. Get the GlyphID of Current Character i.e. gID
    b. Check for Glyph Validity Condition
- c. Store the missing Glyph index info. Add< FrameNumber, indexNumber >to missingGlyphInfo.
- 
- d. Find Similar Font List: Find the list of all fonts that are similar to the font of the current missing glyph. *List of similar font is found using state of art Adobe ATL technology which is based on deep learning CNN network. similarFontList.*
- e. Reorder similarFontList based on missing glyph various other Contextual property like missing font style, type, missingGlyphRepacedFontlist i.e. Fonts with similar style will have more priority.
- Fonts with similar Type will have more priority.
- If similar font list has any font which is already in missingGlyphReplacedFontList list, then prioritize it more since that will help in minimum number of replaced fonts.
- 
-

*Start loop2:*
if(GID!=InvalidGlyphId)
indexNumber =indexNumber +1;
goto *Start loop2*
**Final score: similarity +style +type + *missingGlyphReplacedFontList factor.***
- Unicode Values( U ): Get the Unicode value of the characters used in the missing glyph i.e. their UID
- Count =0, i=0,applicableFontList=0;
- While((count<n)&&(i< reordered list.size())

{
FontID = GetFontInstance(reordered list(i));
If(FontID .GetFontID(UID)!=InvalidGlyphID)
{
applicableFontList.addFont(FontID)
count = count +1;
}
i=i+1;
} o Add the above Applicable font names/list to missingGlyphRepacedFontlist.
   o Add <FrameNumber,indexNumber> to missingGlyphInfo.

*End loop2*
*End loop1*
2. End Algorithm

FIG. 11

INTELLIGENT FONT REPLACEMENT OF MISSING GLYPHS

TECHNICAL FIELD

This description relates to providing a font replacement for particular glyphs in electronic documents.

BACKGROUND

As users increase online activities of uploading content and downloading content via the web, the number of available documents being downloaded to servers and individual computer systems increases. The content may include documents having characters and glyphs generated using particular fonts. Such documents may be drafted using any number of fonts pertaining to formats associated with a variety of application programs hosting the documents.

In general, a character may refer to a general concept of a letter, symbol, umber, ideograph, etc. without reference to a particular font. A glyph may refer to a specific instance of a character in a particular font. A collection of related fonts having different weights and/or point sizes may be referred to as a typeface. Digital typefaces and fonts generally include instructions for rendering characters on an output device, such as a display device, printer, scanner, and/or other output device. Each font may include a character set that contains punctuation marks, numerals, uppercase letters, lowercase letters, and/or other printable characters.

Rendering of characters in real time as a data stream is passed to an output device may result in missing characters if the particular device does not have access to a font used to generate the character. For example, some characters, such as Greek letters, are used infrequently and are not included in many fonts. As a result, an unusual character may be represented by a place-holder symbol when rendered to the output device. In some examples, the output device displays a character that does not fit esthetically with the other characters in the font.

Users may utilize known fonts and/or create new fonts. Other users may wish to download documents generated using the known or new fonts. If the computer system downloading a particular document does not have access to such a font, errors, symbols, or other unwanted remnants may be placed into the document because a particular format for the character may not be available on the computer system. There exists a need for a method and apparatus to intelligently select a font replacement for missing glyphs within documents.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method is described. The method may include obtaining a document and the document may include a plurality of missing glyphs. The method may also include identifying a source font associated with each respective missing glyph, extracting a plurality of features pertaining to the source font for each respective missing glyph. The method may also include identifying a plurality of target fonts for each respective missing glyph based at least in part on the plurality of features extracted from the source font and ranking the plurality of target fonts based on a respective target font having a similarity to the plurality of features. The method may also include triggering for display in a user interface within the document and for each missing glyph in the plurality of missing glyphs, a subset of the ranked target fonts that are ranked highest and which include a character configured to replace each respective missing glyph in the document with a new glyph. Other embodiments of this aspect include corresponding computer systems, apparatus, and computer programs recorded on one or more computer storage devices, each configured to perform the actions of the methods.

Implementations may include one or more of the following features. For example, the method may include receiving a selection of at least one target font from the user interface, replacing each missing glyph with a character corresponding to each respective new glyph. In some implementations, each respective new glyph is associated with the selected target font and is missing from the source font. The method may also include generating at least one formatting indicator on each new glyph to indicate that the font associated with the respective missing glyph is different than the source font.

In some implementations, identifying the plurality of target fonts for each respective missing glyph includes accessing a repository of available fonts and selecting target fonts from the repository of available fonts. The selected available fonts may be configured to display at least one of the plurality of missing glyphs, configured to be visually similar to the source font of at least one of the plurality of missing glyphs, configured to match a type of at least one of the plurality of missing glyphs, and configured to include two or more font properties associated with at least one of the plurality of missing glyphs.

In some implementations, ranking the plurality of target fonts based on a respective target font having a similarity to the plurality of features is based on a combined score generated for each target font, the combined score including a visual similarity score, a stylistic similarity score, a font type score, and a glyph replacement score. In some implementations, a target font is ranked higher in the ranked target fonts if the target font is configured to replace multiple of the plurality of missing glyphs in the document. In some implementations, the subset of the ranked target fonts includes two or more target fonts configured to replace the plurality of missing glyphs.

In some implementations, generating a subset of the ranked target fonts includes discarding a plurality of the ranked target fonts that are incapable of replacing the plurality of missing glyphs in the document, and discarding a plurality of the ranked target fonts that are dissimilar to the plurality of features extracted from the source font.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIGS. 5A-5C illustrate an example of generating glyphs and user interface suggestions to update the glyphs using the system of FIG. 1.

FIGS. 8A-8B illustrate an example of replacing glyphs at the document level.

FIG. 10 is another example code snippet for analyzing missing glyphs using the system of FIG. 1.

FIG. 11 is an example code snippet for scoring fonts using the system of FIG. 1.

DETAILED DESCRIPTION

Figure 1:
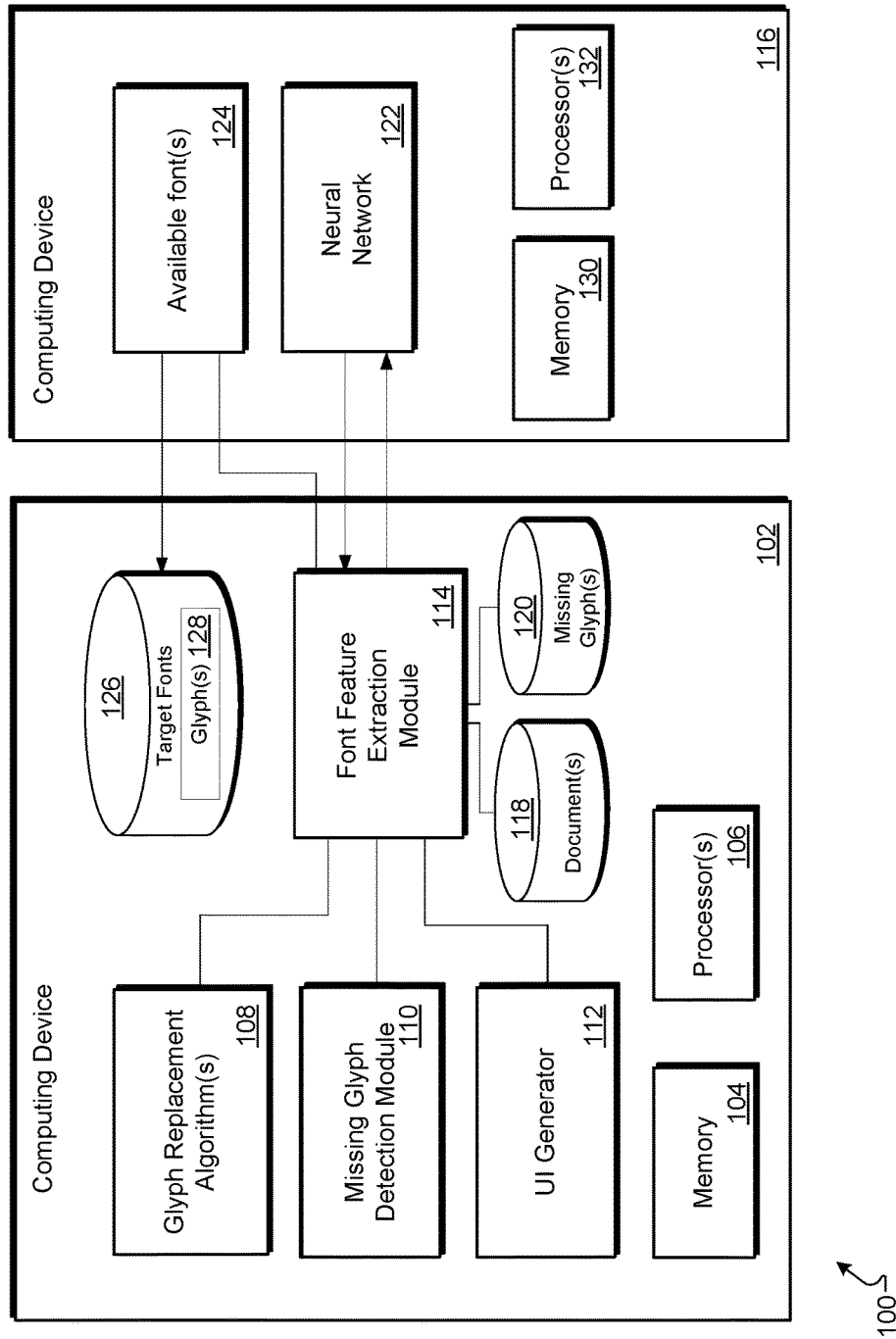
FIG. 1 is a block diagram of an example system for selecting a plurality of font replacements for glyphs in electronic documents, according to an implementation.

This document describes systems and techniques that identify locations of improperly displayed glyphs within a document, analyze aspects of the glyphs, and suggest fonts to properly display the glyphs. As used herein, a glyph represents a specific shape of a letter (or symbol or number) in a particular font or typeface. The systems and techniques described herein may identify locations of missing glyphs (e.g., improperly displayed glyphs) and provide a mechanism in which to correct the missing glyphs. For example, the systems and techniques may analyze the missing glyphs and aspects associated with the missing glyphs to provide a list of suitable fonts that may be used to properly display the glyphs within a document. The fonts may be selected to match and/or approximate one or more aspects of the font(s) currently being utilized in the document (i.e., one or more source fonts). One or more of the suitable fonts may be selected and the systems described herein may apply the selected font(s) to the document to update improperly displayed glyphs with properly displayed glyphs (e.g., glyphs intended to be displayed when the document was drafted). In short, rather than leave a user with an erroneous glyph representation and no way to fix the missing glyphs, the systems and methods described herein generate a minimum set of fonts that are similar to the original font of a glyph (e.g., or document), but that also contain each of the missing glyphs from the document.

In some implementations, improperly displayed glyphs may be depicted as a symbol (e.g., a missing glyph symbol) that indicates that the current font(s) associated with the document is not adapted to properly display the glyph. In such a case, the symbol shown in place of the glyph may indicate to a user (or computing device) that the glyph is missing in the font(s) associated with the document.

The systems and techniques described herein overcome technical challenges of previous systems and techniques, and improve the process(es) to perform related automated glyph replacement. For example, the systems and techniques described herein can detect all instances of missing glyphs within a document (or set of documents) and can automatically correct the glyphs to display appropriate glyphs. In particular, from within an application, and for one or more missing glyphs, the systems and techniques described herein can automatically detect missing glyphs within a document. A determination can be made that a number of fonts available in a computing system contain (e.g., have an ability to properly display) the one or more missing glyphs. Such fonts can be analyzed by the systems described herein to generate a culled list of suggested fonts that can be used to replace the font of the missing glyphs. In some implementations, the font suggestions may be selected for inclusion in a suggested fonts list based upon contextual data in the document associated with the glyph, font data in the document, look and style of the font in the document, and/or particular glyph parameters described in detail below. In general, the suggested fonts may each be used to replace the font of one or more of the missing glyphs in a document to enable the glyphs to be shown as intended by an author of the document, for example.

As used herein, the term "missing glyph" refers to a character that is missing from the character set of a font associated with a particular document. Displaying a missing glyph includes displaying a substitute character to indicate that the particular glyph (e.g., character) is missing from the character set of the font associated with the document. The systems described herein replace missing glyphs with suitable glyphs to represent an author's intended character(s).

In some implementations, from within an application, and for one or more missing glyphs, an automated analysis can be performed to find a number of substitute fonts for a document. The substitute fonts may be used to replace glyphs that are not an element of the font(s) (i.e., source font(s)) utilized in the document. The automated analysis can generate a user interface with any number of font suggestions for replacing the glyphs that are not an element of the font(s) utilized in the document. The described glyph replacement techniques utilize a more efficient, faster, more accurate and more complete algorithm(s) than other algorithms that attempt to provide glyph replacement suggestions. Moreover, the glyph replacement techniques described herein provide for the new computer functionality of, for example, automatically providing a user with intelligent font suggestions for replacing the font of any number of unique or similar missing glyphs while preserving all relevant information of the original font of the document.

In some implementations, the systems and methods described herein can automatically generate font suggestions to replace missing glyphs within documents. For example, the systems and methods can determine which particular target fonts may properly display a glyph to be visually similar to how an author intended to display the glyph, for example. The font suggestions may be provided to a user in a user interface. The user may select upon a font and in response, the systems and methods described herein may update all instances of the missing glyphs in the document (or set of documents) using the selected font. The ability to replace all missing glyphs in an automated fashion, may provide an advantage of increased adoption of use of this technique within documents because the user interaction is minimal. Namely, the user need not manually search and replace each missing glyph in a document by manually selecting each font available in an application providing the document to determine whether the selected font properly replaces the missing glyph(s).

In some implementations, the techniques described herein may enable a designer/author of documents to utilized specialized fonts and characters without worrying that a user may be unable to open the same document on a different computing device or application and be unable to view the content represented by the font. Thus, other users need not purchase different fonts to overcome a problem of the occurrence of one or more missing glyphs. Instead, the techniques described herein may determine a minimum subset of fonts that contain all of the missing glyphs present in a particular document.

In some implementations, the systems described herein can employ the glyph replacement techniques at a document level (e.g., across an entire document). In some implementations, the systems described herein can employ the glyph replacement techniques at a text frame level (e.g., a user or machine selects a frame of text within a document). In some implementations, the systems described herein can employ the glyph replacement techniques upon text selection input (e.g., a user or machine selects upon one or more glyphs causing a highlight of the glyph in a document). In some implementations, the systems described herein can employ the glyph replacement techniques automatically to a set of documents.

FIG. 1 is a block diagram of an example system 100 for selecting a plurality of font replacements for glyphs in electronic documents, according to an implementation. The system 100 includes a computing device 102 having at least one memory 104, at least one processor 106, each capable of executing and/or storing software and/or firmware pertaining to glyph replacement algorithms 108, missing glyph detection module 110, user interface (UI) generator 112, and font feature extraction module 114. The computing device 102 may communicate with one or more other computing devices, e.g., computing device 116 over a network (not shown). The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network or plurality of networks.

Device 102 may be communicably coupled to device 116 via wireless, wired, or other networked connection. In some implementations, the computing device 102 is a server device while computing device 116 is a client device. In some implementations, the computing device 102 is a client device while computing device 116 is a server device. In some implementations, the computing device 102 is a client device while the computing device 116 is a scanner that is connected to device 102. In some implementations, computing device 116 is a server hosting a neural network.

In general, the computing device 102 may provide font features (via font feature extraction module 114, documents 118, and/or missing glyphs 120 to computing device 116. Computing device 116 may analyze received features and data via neural network 122, for example, to retrieve available fonts 124 that may be used as target fonts 126 (e.g., font suggestions) providing proper presentation of glyphs 128.

Neural network 122 is an example of a target network. In some implementations the target network may be on a separate computing device, e.g., computing device 116, than computing device 102. The neural network 122 may be a convolutional network. The neural network 122 may be a fully connected network. The neural network 122 may have any number of hidden layers. The neural network 122 may be a deep neural network.

In some implementations, the neural network 122 is trained for font recognition and font similarity learning. The neural network 122 may carry out several training phases. Output from such phases can be used to learn particular aspects of fonts. The output may include probabilities that may be averaged for each test belonging to a set of fonts to obtain a classification. Feature descriptors (e.g., font feature representations) may be extracted and utilized to define font similarity between fonts, which may be utilized in font suggestion, font browsing, or font recognition applications.

In some implementations, the neural network 122 represents the font feature extraction module 114. That is the neural network 122 may learn feature descriptors during a training phase that utilizes images of font having particular characters (e.g., A-Z; a-z). Feature descriptors learned from such a training phase may be used to evaluate similarities between particular fonts. In some implementations, feature descriptors represent a learned set of features for each font.

Available fonts 124 include fonts that are available and/or accessible by computing device 102 and/or computing device 116. The available fonts 124 may be a pool in which target fonts 126 are selected. Available fonts 124 may be stored on device 102, device 116, or available via local drive, network drive, application, etc.

The processor 106 may represent two or more processors on the computing device 102 executing in parallel and utilizing corresponding instructions stored using memory 104. In some implementations, the at least one processor 106 may be a specialized processor, e.g. a graphics processing unit (GPU). The memory 104 represents a non-transitory computer-readable storage medium. Similarly, the memory 104 may represent one or more different types of memory utilized by the computing device 102. In addition to storing instructions, which allow the at least one processor 106 to implement disclosed embodiments, the memory 104 may be used to store data, such as glyphs 128, missing glyphs 120, documents 118, and/or glyph replacement algorithms 108. The memory 104 may also be used to store processes and modules, such as missing glyph detection module 110, UI generator 112, font feature extraction module 114, etc., and related components.

The glyph replacement algorithms 108 provide a user the control to replace a missing glyph of a font by a new font of choice from a list of fonts (e.g., target fonts 126) populated in a user interface (by UI generator 112) in a document. The algorithms 108 may utilize a number of rules. Such rules may be executed in parallel or sequentially. Example rules include (1) The new font should contain the glyph that was missing, (2) The new font should be visually similar to the font that contained the missing glyph, (3) If the font of the missing glyph was an OpenType font, the new font should also be OpenType, (4) If the font is already being used to replace one of the missing glyph, that font is provided higher priority than another single use font, and (5) If the font of the missing glyph has a property "p," then the new font should also have property "p."

In some implementations, no suggestions may be found to replace missing glyphs. In such an example, the system 100 can neglect rule (5) and search for a font. If the list of suggestions is still empty, the system 100 can neglect rule (4). If the list of suggestions is still empty, the system 100 can neglect rule (3) and/or (2) to arrive at a suggested target font.

In some implementation, a particular priority can be set based on the rules. One example priority is to ensure that first the target font is of OpenType (or TrueType) font if the missing glyph is of the OpenType (or TrueType) font. Second, the system 100 may further prioritize by ensuring that the target font being suggested will be a font that is used to replace more than one of the missing glyphs within a document. Third, the system 100 can utilize the properties of fonts to ensure that the target font being suggested has a same property (e.g., fraction, ordinal, etc.) of the font of the missing glyph.

The missing glyph detection module 110 may retrieve and/or otherwise obtain documents and determine a number of missing glyphs within the document. The missing glyph detection module 110 can index such locations of the missing glyphs to assist with glyph replacement performed by other modules in system 100. For example, the missing glyph detection module 110 may function with glyph replacement algorithms 108 and font feature extraction module 114 to determine one or more fonts that may display the missing glyphs 120 for one or more documents 118. Upon finding one or more fonts that include the characters that ought to be displayed in place of the missing glyphs, the user interface (UI) generator 112 may generate and provide a contextual menu with a list of all the similar fonts in the system that contain a particular missing glyph.

The user interface (UI) generator 112 may generate suggested fonts for display within an interactive interface associated with a missing glyph in a document. The generator 112 may provide two or more font suggestions along with additional data pertaining to the font suggestions. The generator 112 may also provide interactive controls enabling a user to select upon font suggestions, select font suggestions, modify font suggestions, configure font suggestion algorithms, etc.

The font feature extraction module 114 may utilize (or receive information from) the neural network 122 to analyze (e.g., learn from) features within particular documents, fonts associated with the documents, and target fonts 126, in general. The font feature extraction module 114 may use neural network 122 to find how similar two particular fonts are to each other. For example, the module 114 may compare the document font to any number of fonts available to determine such similarities. A feature descriptor corresponding to both fonts in each comparison can be determined. The comparison may be used to generate a distance between the generated feature descriptors. A shorter distance indicates a more likely similarity between fonts. In one example, a font corresponding to a missing glyph is compared to a second font corresponding to the rest of the font in the document (e.g., or an available user repository). Upon determining similarities (or dissimilarities), the module 114 may return a list of fonts in order of similarity to the font corresponding to the missing glyph.

Example font features may include a font type, a font property, a font weight, a font style, a font variant, a font size, a font family, etc. In some implementations, the font feature extraction module 114 can determine that a particular font may be used within a document (or set of documents) as a possible font to replace other missing glyphs within the document (or set of documents). As such, the module 114 can suggest and/or prioritize a font that is utilized more than once within a document to replace glyphs over a font that may apply to replacing a single glyph.

The computing device 116 may include memory 130 and processors 132. The computing device 116 may utilize memory 130 and processors 132 to carry out operations using the systems, methods, and techniques described herein. The computing device 116 may include (or have access to) neural networks 122. The computing device 116 may include (or have access to) available fonts 124.

In operation, the system 100 may be used for analyzing missing glyph. The algorithms 108 may be used to recognize a document that includes missing glyphs, identify a source font associated with each respective missing glyph, extract features from the source font for each respective missing glyph, identify one or more target fonts for each respective missing glyph based the features extracted from the source font, and rank the plurality of target fonts based on a respective target font having a similarity to the plurality of features. The output of the algorithms 108 may be used to display a user interface within the document. In the user interface, a subset of the ranked target fonts that are ranked highest and which include a character configured to replace each respective missing glyph with a new glyph may be displayed.

In some implementations, the ranking may include determining which font may be used for particular glyph replacement. Such a determination may include using cumulative properties derived from a visual similarity between fonts (e.g., using deep neural networks/convolutional neural networks), font style, font type, and a font propensity or ability to replace other missing glyphs within a document.

In some implementations, the algorithms may be executed on computing device 102 or computing device 116 to perform automated glyph replacement algorithms (e.g., to provide proper glyph representation in electronic documents). In one example of implementing such algorithms, a document, selection, or text frame may be received by the systems described herein. The document, selection of text, or a selected text frame may have missing glyphs indicated in any language. A vector may be generated that includes information related to each missing glyph. For example, the vector may identify a frame number, an index number, a glyph identifier number, etc. A second vector may be generated that includes a list containing a set of applicable fonts for each missing glyph identified in first vector. The vectors may be generated by font feature extraction module 114 and/or missing glyph detection module 110.

The UI generator 112 may generate a font replacement list that identifies all applicable fonts which are able to replace at least one missing glyph amongst all missing glyphs in the document, selection, or text frame. Upon identification of the applicable fonts, the system 100 described herein can cycle through each frame in a document to find missing glyphs to begin to generate a list of target fonts that are similar to a source font that authored each particular glyph in the document, selection, or text frame. To do so, the missing glyph detection module 110 may retrieve a glyph identifier of each character represented as a missing glyph, check each character for validity, and store the missing glyph index information in the first vector.

The system 100 may then search for a similar font list. For example, the systems may search to find a list of all fonts that are similar to the font of each missing glyph within a document, selection, or text frame, for example. In one example implementation, the list of similar fonts may be found using a deep learning convolutional neural network (CNN) 122.

Upon determining the list of similar fonts pertaining to all glyphs within the document, selection, or text frame, the list of similar fonts (e.g., target fonts) may be reordered based on particular properties associated with one or more missing glyphs. For example, various contextual properties including missing font style, font type, font feature similarity, etc. may be used to order the list of similar fonts. In some implementations, fonts with a similar style may be moved upward on the list because such a similarity may increase the priority of the similar font. In addition, fonts with a similar type may have more priority than fonts without a similar type to the missing glyph font. In some implementations, if a particular font in the similar font list includes a font which is already in the target fonts 126 list, then that font may be prioritized ahead of other fonts to minimize the length of the list of replacement fonts.

The system 100 may utilize the font feature extraction module 114 to score target fonts when selecting such fonts for display to the user. Upon reordering the list of similar target fonts (described above), the system 100 may generate a final score based on font similarity, font style, font type, and which position the font resides within a suggested list of target fonts 126. The Unicode values (e.g., UIDs) of the characters used in the missing glyphs may be obtained. The reordered list may be retrieved and each font in the list that includes the obtained UID(s) may be added to the suggested list of target fonts 126 for provision and display to a user.

Figure 2:
FIG. 2 is an illustration of example glyphs representing the Unicode character 067 in various different typefaces.

FIG. 2 is an illustration of example glyphs 200 representing the Unicode character 067 (i.e., the letter G) in various different typefaces. In typography, in general, a glyph represents a specific shape of a letter (or symbol or number) in a particular font or typeface. Each character of a font may be a glyph. For example, the letter "G" as shown at 200 looks different as represented by different typefaces. The glyphs 200 may each look different from another glyph, but the intent or meaning of the letter is represented by the Unicode value, which remains constant throughout various typographical presentations of the same letter.

Figure 3A:
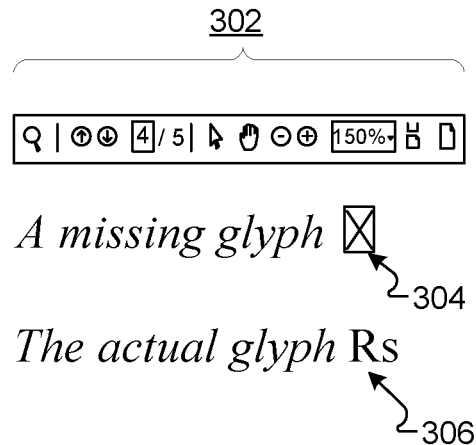
FIGS. 3A-3B illustrate example screenshots depicting a representation of missing glyphs rendered in a document.
Figure 3B:
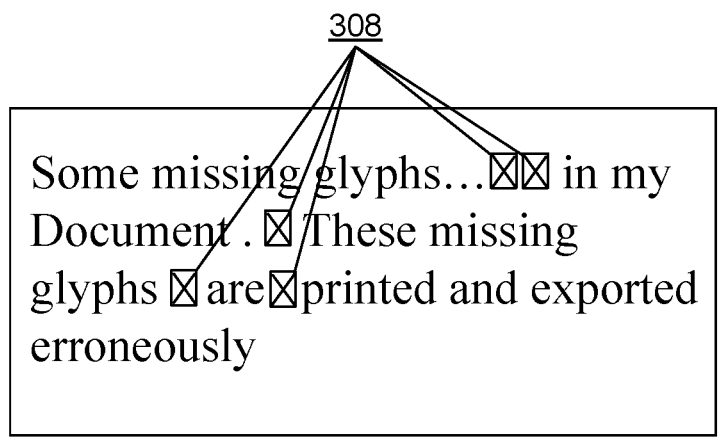

FIGS. 3A-3B illustrate example screenshots depicting a representation of missing glyphs rendered in a document when the document is printed or rendered, for example. FIG. 3A depicts a document menu 302 to interact with font in a document. A glyph that is not part of a particular font represented in content a document may be represented by an example symbol showing a rectangle with an X, as shown at missing glyph symbol 304. This missing symbol 304 indicates that the actual glyph 306 "Rs" (representing an India rupee [INR]) is depicted correctly.

Fonts may indicate missing glyphs in a variety of different ways within documents. Any character may be selected to indicate that a particular glyph is not available in the current fonts represented in a particular document. In one example within OpenType fonts, a glyph with ID 25A1 may be assigned to a ".notdef glyph." The ".notdef" glyph may be a missing glyph indicator that is used to provide a user viewing the document with feedback that a particular glyph is not found in the font(s) used to depict the content of the document. In general, this missing glyph indicator is used with an outline surrounding the glyph to indicate to the user that the particular active font(s) of the document do not support the glyph attempting to be shown. In some implementations, the shape of the ".notdef" glyph may be an empty rectangle, a rectangle with a question mark inside, or a rectangle with an "X" 308, as shown in FIG. 3B.

The display of missing glyphs within documents may occur for a number of reasons. In one example, opening a document on a computing system with fewer fonts available as compared to a number of fonts available in a computing system that created the document may cause missing glyphs to be displayed in the document. This can occur because applications typically replace any character that is associated with a missing font with a default font associated with the particular application that opened the document. In such a scenario, all glyphs or characters that are not part of the default font of the application will turn into missing glyphs.

In another example, missing glyphs may be depicted within a document upon opening of the document if the document contains glyphs of a font version different from the version present in the current computing system. As font versions change, the creators may add new glyphs to the font and old glyphs may be removed. In such scenarios, some of the characters in the document may turn into missing glyphs because the characters are no longer part of (e.g., supported) by the new font version. For example, an example glyph with UID value FDFD. The original version of the font in which the glyph was written may be version 6.96. When the font is opened in a computing system having version 5.013 installed, the glyph may be missing. This is because a glyph with UID: FDFD is present in version 6.96 of Times New Roman font but not present in version 5.013 of the same font. In some implementations, opening this document on a system with an older font version will not show any missing font but will automatically turn this glyph to a missing glyph.

In another example, using different font styles of the same font family may also result in missing glyphs. For example, consider fonts "Perpetua Titling MtLight" and "Perpetua Titling MtBold." Although the fonts are part of the same family "Perpetua Titling," a glyph of a French Franc Sign with UID 20A3 is present only in "Perpetua Titling MtLight." Replacing a font in the document with another font may again result in particular characters turning into missing glyphs, since the available glyphs in both the fonts may be different. For example, when the same text written in font "Kozuka" is replaced by font "Ming-LiU," all of the glyphs turned to missing glyphs because all of the characters are not supported by the font "Ming-LiU."

In another example, opening a document with text containing unique glyphs limited to paid fonts by a user that does not have access to some of the paid fonts used in styling of the document may cause display of missing glyphs for the user that does not have access to such paid fonts.

With advancement in typography, a large number of designers have started using SVG (scalable vector graphic) and Emoji fonts in documents. Opening such documents on software that cannot render the fonts may result in majority of text characters being converted into missing glyphs. Missing glyphs are also found in large numbers when documents are created by a user of a different linguistic area. For example, a user in Japan is bound to use many Japanese fonts and glyphs when drafting a document. When such a document is opened by another user working on an Arabic machine, a majority of the Japanese fonts may be missing, resulting in a large number of missing glyphs in the document.

Figure 4A:
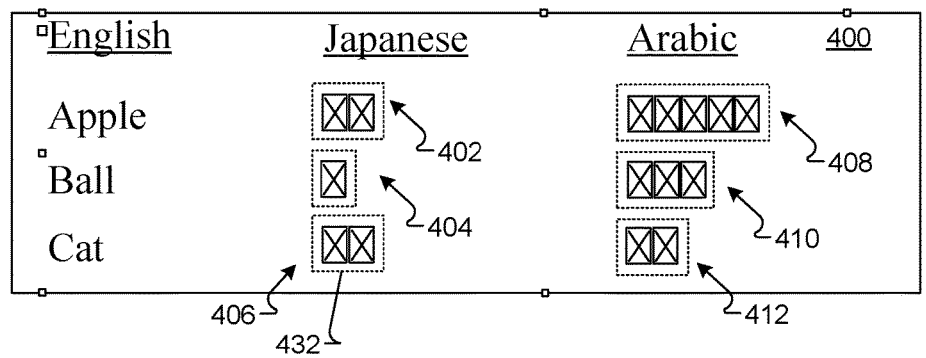
FIGS. 4A-4B illustrate an example of using document information to generate glyphs and user interface suggestions to update the glyphs using the system of FIG. 1.
Figure 4B:
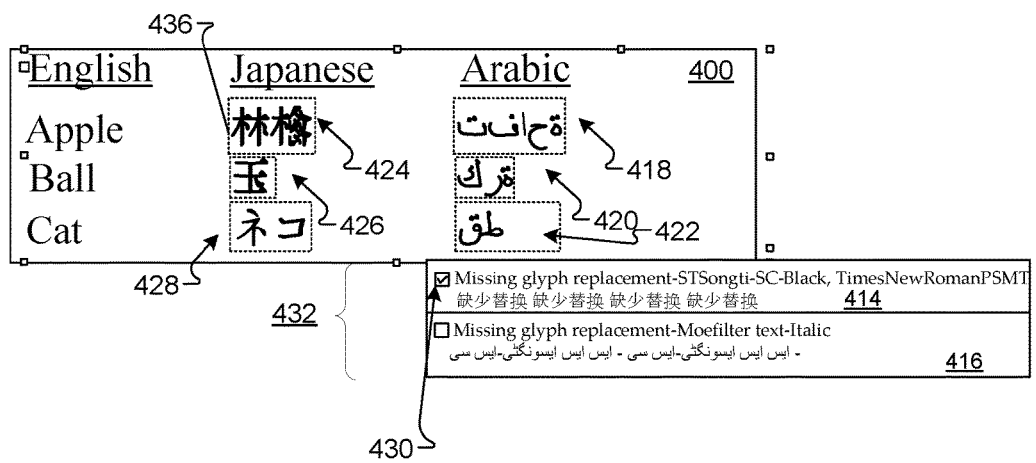

FIGS. 4A-4B illustrate an example of using document information to generate glyphs and user interface suggestions to update the glyphs using the system of FIG. 1. Here, missing glyphs 402, 404, 406, 408, 410, and 412 appeared in a document 400 displayed to a user on a computing device. The missing glyphs 402-412 represent the words Apple, Ball, and Cat, as spelled in Japanese (402-406) and Arabic (408-412). Such symbols that make up the Japanese language and the Arabic language are not supported by font character sets represented in English language fonts. Therefore, the document 400 (or application displaying the document 400) interprets the missing glyphs 402-412 (e.g., characters) as missing from the character set(s) defined by one or more fonts associated with the document 400.

A user that retrieved the document 400 for display may wish to be provided options for displaying correct characters for the missing glyphs 402-412. To do so, one or more fonts that include the character(s) of the missing glyphs 402-412 will have to be found. In some implementations, the user may search through thousands of available fonts, manually selecting each font to determine if the selected font(s)

restore the missing glyph. Searching and checking each font is both a tedious and time-consuming process. Thus, the system 100 may analyze each missing glyph that appears in the document. For example, the missing glyph detection module 110 may function with glyph replacement algorithms 108 and font feature extraction module 114 to determine one or more fonts that may display the missing glyphs 120 for one or more documents 118. Upon finding one or more fonts that include the characters that ought to be displayed in place of the missing glyphs, the user interface (UI) generator 112 may generate and provide a contextual menu with a list of all the similar fonts in the system that contain a particular missing glyph. In some implementations, the glyph detection algorithms may be generically applied to determine fonts in order to provide suggestions of fonts for replacing the font of the missing glyphs even if the original font is of a different language, as shown in FIG. 4B in document 400. In particular, an "STSongti-SC-Blkack" font and a "TimesNewRoman" font 414 are listed as a first option and a "Moefilter text-Italic" font 416 is listed as a second option. The fonts 414 and 416 are presented in a menu to the user.

In general, if the user opens a document that has a missing glyph (e.g., missing glyphs 408, 410, and 412, for example) which is part of an Arabic font, the system 100 can identify the Arabic font and replace the font by a suitable English font that includes that glyph in the English character set associated with the English font, as shown by glyphs 418, 420, and 422. Similarly, if the user opens a document that has a missing glyph which is part of a Japanese font (e.g., missing glyphs 402, 404, and 406), the system 100 can identify the Japanese font and replace the font by a suitable Arabic font that includes that glyph in the Arabic character set associated with the Arabic font, as shown by glyphs 424, 426, and 428. Further, if the user opens a document that has a missing glyph which is part of an English font, the system 100 can identify the English font and replace the font by a suitable Arabic font that includes that glyph in the Arabic character set associated with the Arabic font.

As shown in FIG. 4B, the user has been provided a user interface depicting fonts 414 and 416. Such fonts are selectable by the user. Upon selection of one or more fonts in the list, the system 100 may automatically replace all missing glyphs in the document with the selected font(s). In this example, the user has selected 430 option 414 and in response, the system 100 replaced the missing glyphs 402-412 with corresponding corrected glyphs 418-428.

In some implementations, the system 100 may determine all fonts that may be used to replace the missing glyphs in a document. For example, if there are 350 unique missing glyphs in a document, the system 100 may automatically determine a list of fonts that may be substituted in order to properly depict the glyphs that are missing. In addition, the system 100 may narrow the list of fonts to a minimized number of selectable fonts based on a number of aspects associated with the fonts of the missing glyphs and the fonts selected to replace the missing glyphs. This may provide an advantage of reducing an amount of space for displaying the user interface of selectable fonts. Minimizing the list of fonts may include selecting all fonts that properly display one or more missing glyph, removing all of the repeated fonts in the list of all fonts, and weighting the remaining fonts in the list based on various font aspects.

For example, the system 100 may execute one or more glyph replacement algorithms 108 at a document level for document 400 (in FIG. 4A) to provide the minimum subset of fonts that are similar the original font of the missing glyph (e.g., Japanese or Arabic) and that also collectively have all of the missing glyphs of the document. Instead of suggesting different fonts to replace each missing glyph thus providing a large list of fonts to the user, the algorithms 108 may give more weight to a font that already replaces a missing glyph previously identified in the document. This may result in providing the user a minimum set of fonts that replace the missing glyphs.

To ensure that an appearance and style of a particular replaced font is similar (in appearance and style) to font in the remainder of the document 400, the system 100 may consider glyph parameters that provide the user a font substitution suggestion list populated by fonts similar to original font. For example priority may be given to fonts that are similar to the original font of the document housing the missing glyphs. The priority may be used to move a particular replacement font upward on a ranked list of replacement fonts, for example.

In some implementations, a glyph parameter may include a font type. For example, a user may wish to find a new font of the same type as the font depicting the missing glyphs in the source document. A font type may include OpenType or TrueType. The algorithms 108 may ensure that font type preservation is honored to the fullest whenever font substitution is suggested. Thus, the system 100 may provide a font suggestion of a different font type (than the source document) in the user interface of selectable replacement fonts when there exists no font with the same type that contains the missing glyph depicted in the source document. Although only two font replacement suggestions are provided, any number of suggestions may be provided in the user interfaces described herein.

In some implementations, the system 100 may highlight missing glyphs, as shown by example dotted line 432 in FIG. 4A. Such a highlight may indicate to a user each missing glyph within a particular document. The system 100 can modify each highlighted glyph upon receiving direction from the user (e.g., a selection of a suggested font from user interface 432, for example. Upon completion of applying the updated font to the highlighted glyphs, the system 100 may continue to provide a highlight indication, as shown by example updated glyph 424 at highlight 436. This can provide the user with visual indications and feedback with respect to which content may be modified within a document. In some implementations, selection of a font in a user interface such as interface 432 may dictate a subset of glyphs to be highlighted.

FIGS. 5A-5C illustrate an example of generating glyphs and user interface suggestions to update the glyphs using the system of FIG. 1. As shown in FIG. 5A, a document 500 includes text depicted using the font "Times New Roman." The text includes items and costs associated with such items. The costs include text having missing glyphs, represented by missing glyphs 502, 504, 506, 508, and 510. The missing glyphs 502-510 should instead be a "Rupee Sign" glyph to represent the Indian currency of Rupee. If the user wishes to change the font type to a TrueType font, the user may select to replace the font. Because of this font change, the glyphs 502-510 represented with Unicode ID (UID: 20A8 "Rupee Sign") are now represented as missing glyphs.

Because the font change caused the missing glyphs 502-510, the system 100 may automatically analyze which fonts may be used to restore the glyphs, as shown in glyphs 512, 514, 516, 518, and 520, restored as "Rp" in FIG. 5B. The analysis may be used to automatically generate and present a user interface 522 with suggestions 524 and 526. The user may select upon one of the presented font suggestions 524,

526 (or other suggestions presented in the user interface 522) to replace the font of the missing glyph with another TrueType font. Since the user intended to change the font of the text to a TrueType font, the suggestions given to the user are also TrueType fonts. As shown in FIG. 5C, the user has selected font suggestion 526. Accordingly, the system 100 modified the font to the "Moefilter text-Black font," as shown by updated glyphs 530, 532, 534, 536, and 538. Although only two font replacement suggestions are provided, any number of suggestions may be provided in the user interfaces described herein.

In some implementations, the system 100 may use, for a particular document, fonts that have similar glyph classes. Using fonts with similar glyph classes in the document that all have ligature and fraction glyphs may assist a designer (e.g., document author) to apply properties like "fractions", "ordinals", "superscript" etc. throughout the document without worrying if the fonts used in the document support these properties. In addition to providing suggestions based on visual appearance, the system 100 may consider a font with a subset of properties that are similar to the original font as a candidate for font Glyph substitution/replacement only if it contains the missing glyph.

Figure 6A:
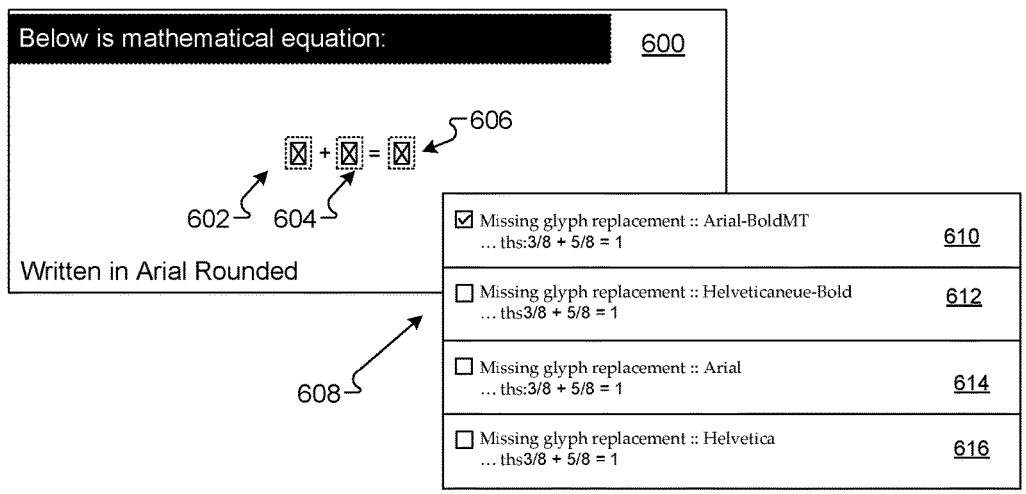
FIGS. 6A-6B illustrate an example of generating glyphs and user interface suggestions to update the glyphs using the system of FIG. 1.
Figure 6B:
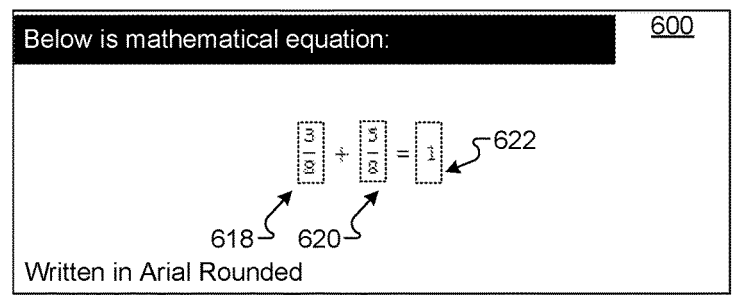

FIGS. 6A-6B illustrate an example of generating glyphs and user interface suggestions to update the glyphs using the system of FIG. 1. The system 100 may recognize that a number of glyphs are missing, as shown in FIG. 6A at document 600. In this example, the missing glyphs 602, 604, and 606 were written in "Arial Rounded" font. The missing glyphs 602-606 were to represent a mathematical equation. However, the document 600 when opened by a user that does not have access to "Arial Rounded" font may be provided the missing glyphs, as shown. The system 100 can generate a list of suggested fonts 608 that contain proper glyphs for each of the missing glyphs 602, 604, 606. The list of fonts may be fonts that preserve properties of the original font. Each suggestion 610, 612, 614, 616 in the list of suggested fonts 608 may be selected because each missing glyph 602-606 is included in the character set of each respective font and because the font preserves properties of the original font (e.g., supports fractions, superscripts, etc.).

Upon opening document 600, a user may have been presented missing glyphs 602-606. The missing glyphs may be presented to the user with a missing glyph character(s) and a highlighted indication on the missing glyph character(s). The user may select one of the missing glyphs (e.g., glyph 602) to be presented the list of suggestions 610-616 in user interface 608, as shown in FIG. 6A. The system 100 selects and generates the list of suggested fonts that contain the missing glyphs. The user may select a suggested font. In this example, the user selected "Arial-BoldMT" font 610. Although only four font replacement suggestions are provided, any number of suggestions may be provided in the user interfaces described herein.

As shown in FIG. 6B, the user's selected font 610 is implemented to replace missing glyphs 602, 604, and 606 with glyphs 618, 620, and 622. Here, the font suggestions namely "Arial Bold", "Helvetica Neue", "Arial," and "Helvetica" provided to the user are similar to the font "Arial Rounded" font used to draft the equation in the source document.

Figure 7A:
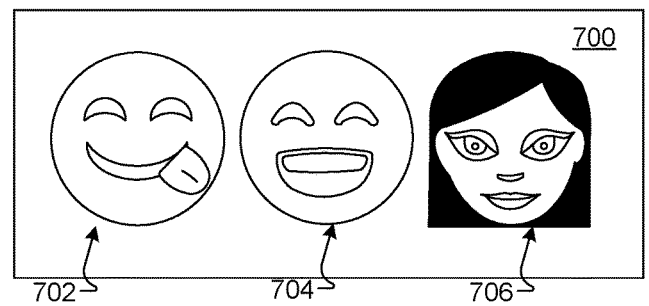
FIGS. 7A-7C illustrate an example of replacing glyphs of special font classes using the system of FIG. 1.
Figure 7B:
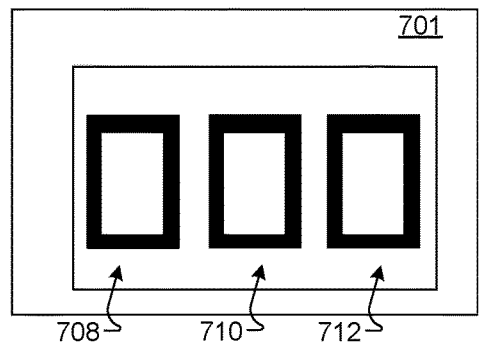
Figure 7C:
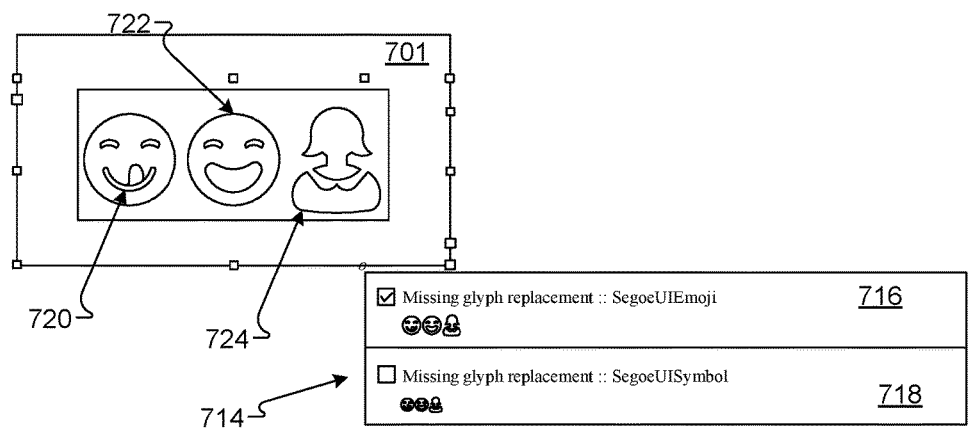

FIGS. 7A-7C illustrate an example of replacing glyphs of special font classes using the system of FIG. 1. An example special font class may include scalable vector graphic (SVG) fonts. As shown in FIG. 7A, a document 700 was drafted by a first user using text written in an OpenType SVG font. In particular, Emojis (e.g., shown by source glyphs 702, 704, and 706) include images of faces in this example. As shown in FIG. 7B, another user opened document 700 (as shown by open document 701 in FIG. 7B). The application and/or computing device that the user used to open the document shown in FIG. 7B does not support the SVG font used to generate glyphs 702, 704, and 706. Therefore, the characters represented by glyphs 702, 704, and 706 are replaced by missing glyph (indicators) 708, 710, and 712.

The system 100 may automatically provide a user interface 714 with options for selecting a font to replace the missing glyphs 708, 710, and 712. In this example, the user is provided a "SegoeUIEmoji" 716 font and a "SegoeUIsymbol" font 718. The user selected font 716. Accordingly, the system 100 replaced the missing glyphs 708, 710, and 712 with visually similar glyphs 720, 722, and 724. The glyphs 720, 722, and 724 are not identical to the source glyphs 702, 704, and 706. However, the selected font includes reasonable similarity to the source glyphs 702-706.

The system 100 may provide fonts of a different type in the user interface (e.g., user interface 714). For example, although the font suggestions given to the user in user interface 714 (e.g., "SegoeUI Emoji" and "SegoeUISymbol") are not SVG fonts, the are displayed in the user interface 714 because other SVG fonts that included the glyph content to correct missing glyphs 708, 710, and 712 were not available.

In operation, to provide the user interface 714, the system 100 may obtain the document 701 that includes a number of missing glyphs 708, 710, and 712. The system 100 may identify a source font associated with each respective missing glyph (e.g., a source font that created glyphs 702, 704, and 706). The system 100 may then extract features pertaining to the source font (that created glyphs 702, 704, and 706). Example font features may include a font type, an ordinal property, a font weight, a font style, a font variant, a font size, a font family, etc.

The system 100 may identify target fonts for each respective missing glyph in the document based at least in part on the features (e.g., feature descriptors) extracted from the source font. Identifying the target fonts for each respective missing glyph may include accessing a repository of available fonts and selecting target fonts from the repository of available fonts that are configured to display at least one of the missing glyphs, configured to be visually similar to the source font of at least one of the missing glyphs, configured to match a type of at least one of the missing glyphs, and configured to include two or more font properties associated with at least one of the missing glyphs.

The system 100 may rank the target fonts based on a respective target font having a similarity to one or more of the features. Ranking the target fonts may include ranking each respective target font based on a combined score generated for each target font. The combined score may include a visual similarity score, a stylistic similarity score, a font type score, and a glyph replacement score. The visual similarity score includes font properties that may be gleaned for a font by a neural network, for example. The stylistic similarity score includes font properties such as normal font style, italic font style, oblique font style, etc. The font type score includes a font property that classifies fonts into OpenType, TrueType, etc. The glyph replacement score pertains to whether or not a target font is utilized within the document to replace other missing glyphs. The glyph replacement score may be used to minimize a number of target fonts because the system 100 can select a target font that is useable for several missing glyphs in the document over a target font that is capable of only replacing a single missing glyph in the document.

The system 100 may utilize the analyzed target fonts to trigger for display in a user interface 714 and within the document, a subset of the ranked target fonts that are ranked highest and which include a character configured to replace each respective missing glyph with a new glyph. The system 100 may provide such a subset for each missing glyph in the missing glyphs. Alternatively, the system 100 may provide a single list of selectable fonts that replace all missing glyphs in the document. In some implementations, a number of user interfaces similar to user interface 714 may be displayed next to each missing glyph. For example, upon a user hover over a missing glyph, a pop-up interface may be displayed to allow the user to quickly select which font to replace missing glyphs with properly displayed characters.

Figure 8A:
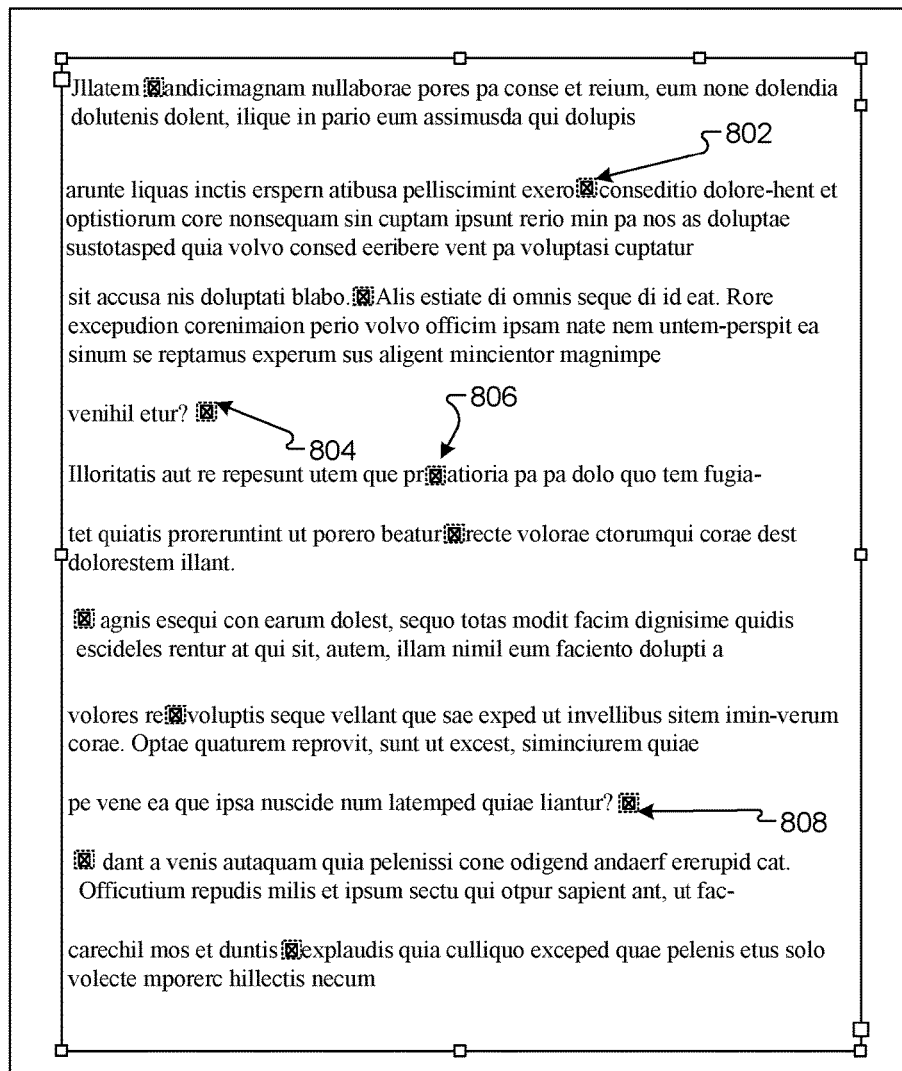
Figure 8B:
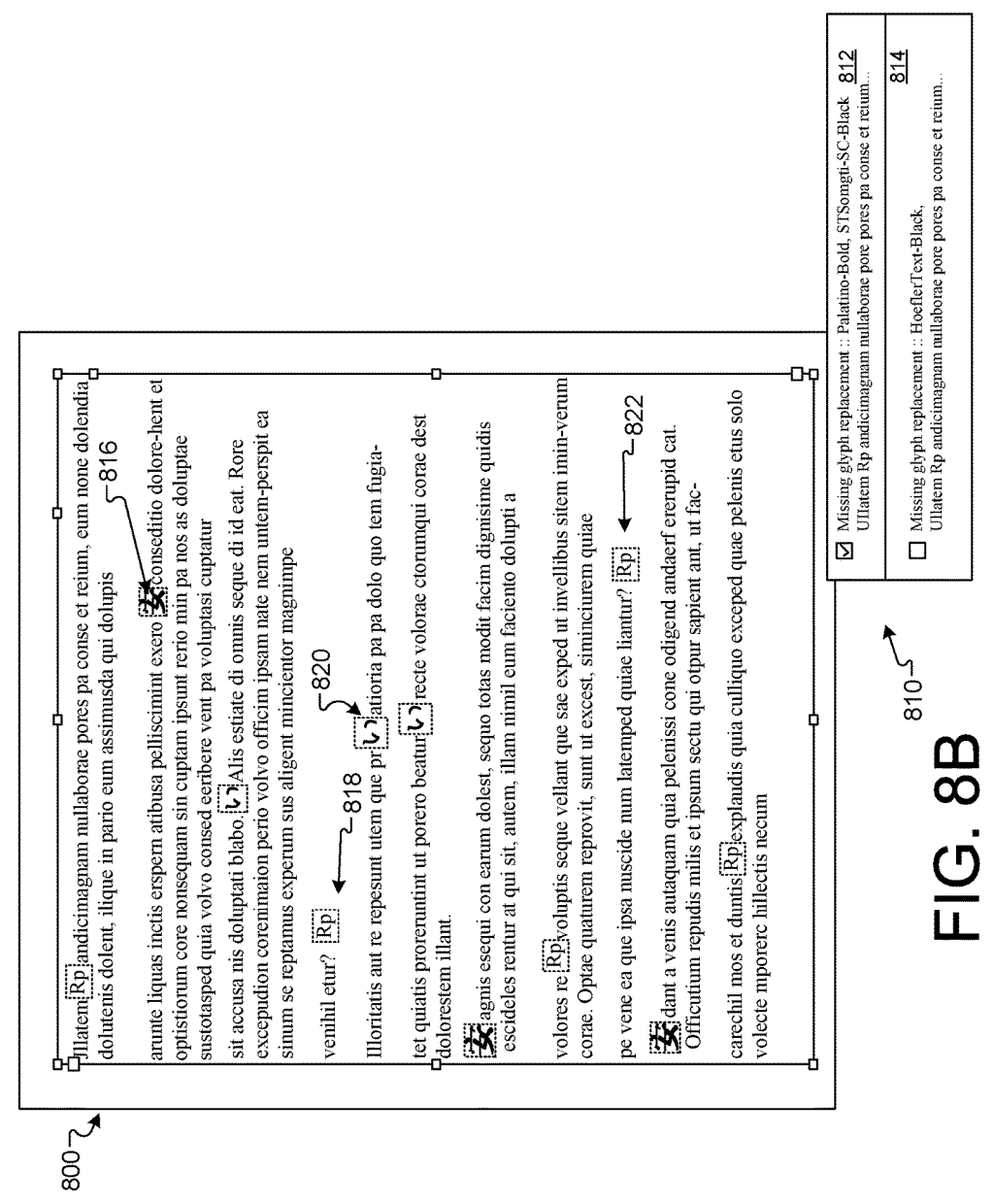

FIGS. 8A-8B illustrate an example of replacing glyphs at the document level. FIG. 8A depicts a number of missing glyphs (e.g., glyphs 802, 804, 806, 808, etc.) indicated by a square with an "X" inside. The system 100 has also highlighted the glyphs to indicate to the user which characters are improperly displayed within the document.

Multi-paged documents may have numerous instances of missing glyphs. In such a scenario, the process to correct each missing glyph instance becomes practically impossible to perform manually. To correct all instances of the missing glyphs in a seamless fashion, the system 100 may automatically determine and provide a selectable number of target fonts that can be used to replace missing glyphs 802, 804, 806, 808, etc.

For example, consider a user system with 100 fonts. The user may open a document and may see ten missing glyphs (802, 804, 806, 808, etc.), as shown in FIG. 8A. In the worst case the user may have to manually try to replace (100*10) times to find a suitable font for each of the missing glyphs. Moreover, some of the missing glyph instances may also be missed while doing a manual scan of the document.

The system 100 may detect all instances of the missing glyphs. The user can also easily replace all missing glyph instances in one click upon the system 100 providing suggested fonts for replacing the missing glyphs. When the user selects the font, the system 100 substitutes the font of each of the missing glyphs with another font that is visually similar to the original (e.g., source document) font. This can save the user time, simplify the workflow, and ensure that all instances of the missing glyphs have been found and replaced correctly.

As shown in FIG. 8B, a user has been provided a user interface 810 with replacement fonts 812 and 814. The user has selected font 812, which triggers replacement of the missing glyphs 802-808, etc. with glyphs of a visually similar font, as shown by glyphs 816, 818, 820, and 822, etc. All the replaced instances are highlighted to indicate to the user that the font modification has occurred.

Figure 9:
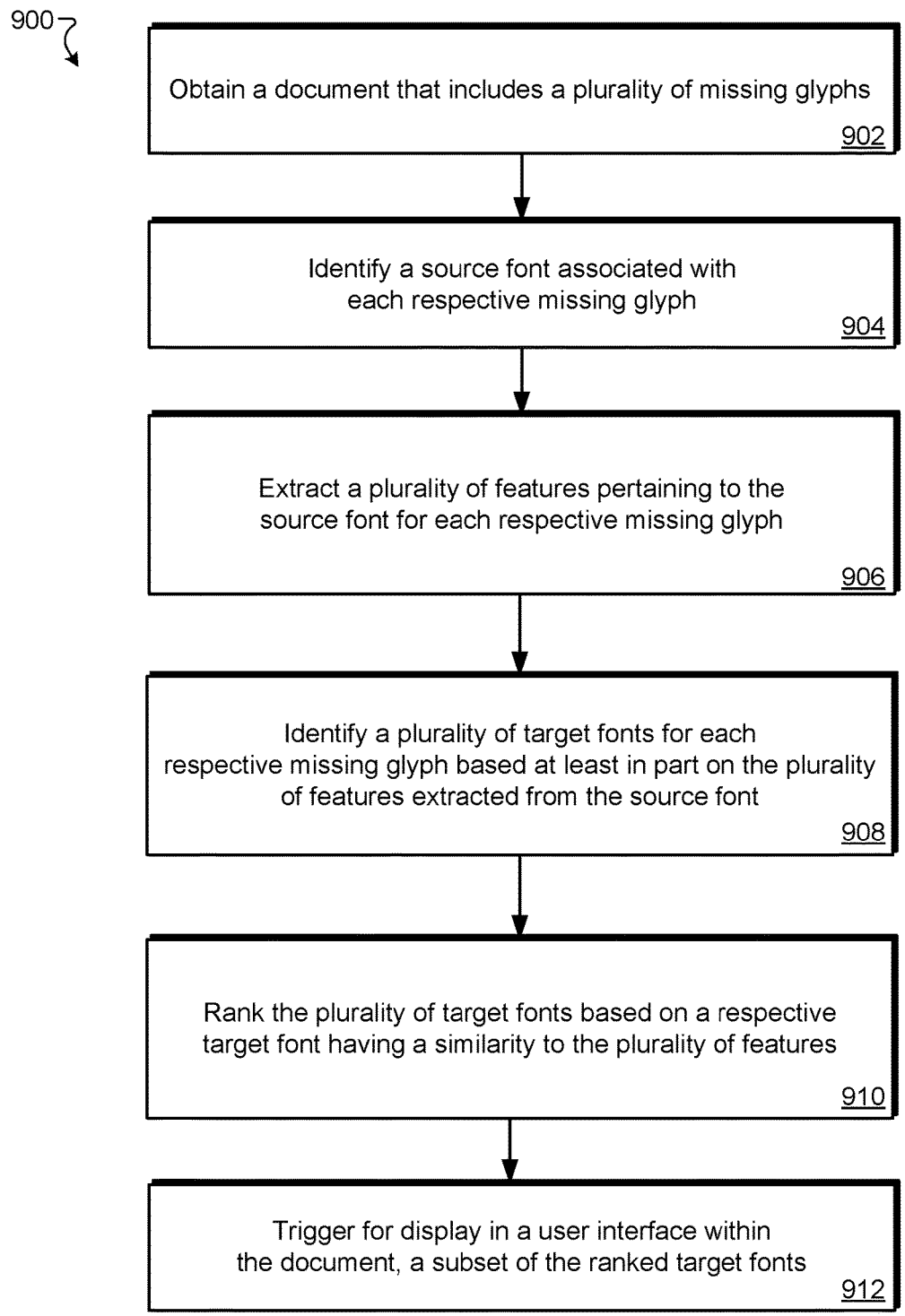
FIG. 9 is an example flowchart illustrating example operations of the system of FIG. 1.

FIG. 9 is an example flowchart illustrating example operations of the system of FIG. 1. Process 900 may be performed by a system such as system 100 of FIG. 1. Process 900 may include obtaining (902) a document that includes a number of missing glyphs. For example, the font feature extraction module 114 may utilize the missing glyph detection module 110 to obtain and/or retrieve a document 118 with missing glyphs 120.

The process 900 may include identifying (904) a source font associated with each respective missing glyph. For example, the missing glyph detection module 110 may identify a source font associated with each respective missing glyph. The process 900 may include extracting (906) a number of features pertaining to the source font for each respective missing glyph. For example, the font feature extraction module 114 may extract a plurality of features pertaining to the source font for each respective missing glyph. For example, the font feature extraction module 114 may utilize the neural network 122 to analyze features within particular documents, fonts associated with the documents, and target fonts 126, in general. Example font features may include a font type, a font property, a font weight, a font style, a font variant, a font size, a font family, etc.

The process 900 may include identifying (908) a number of target fonts for each missing glyph based at least in part on the plurality of features extracted from the source font. For example, the glyph replacement algorithms 108 may be used to identify a number of target fonts for each respective missing glyph based at least in part on the plurality of features extracted from the source font associated with the missing glyphs 120. A target font may pertain to a font that: contains the glyph that was missing in the document, includes visually similar aspects to the source font, includes a same font type as the source font, and includes particular properties also in the source font.

In some implementations, identifying the plurality of target fonts for each respective missing glyph includes accessing a repository of available fonts and selecting target fonts from the repository of available fonts 124, for example. The target fonts may be stored at repository 126 and may each be configured to display at least one of the plurality of missing glyphs, configured to be visually similar to the source font of at least one of the plurality of missing glyphs, configured to match a type of at least one of the plurality of missing glyphs, and configured to include two or more font properties associated with at least one of the plurality of missing glyphs.

The process 900 may include ranking (910) the plurality of target fonts based on a respective target font having a similarity to the plurality of features. For example, the glyph replacement algorithms 108 may be used to rank the plurality of target fonts 126 based on a respective target font having a similarity to the plurality of features determined by the font feature extraction module 114 and/or associated with a definition of the available font 124.

In some implementations, ranking the plurality of target fonts based on a respective target font having a similarity to the plurality of features is based on a combined score generated for each target font. For example, the combined score may include a visual similarity score, a stylistic similarity score, a font type score, and a glyph replacement score, as described in detail above. In some implementations, a target font is ranked higher in the ranked target fonts if the target font is configured to replace multiple of the plurality of missing glyphs in the document. In some implementations, the subset of the ranked target fonts includes two or more target fonts configured to replace the plurality of missing glyphs.

In some implementations, generating a subset of the ranked target fonts includes discarding a number of the ranked target fonts that are incapable of replacing the missing glyphs in the document and discarding a number of the ranked target fonts that are dissimilar to the features extracted from the source font.

The process 900 may include triggering (912) for display in a user interface within the document and for each missing glyph in the missing glyphs, a subset of the ranked target fonts that are ranked highest and which include a character configured to replace each respective missing glyph with a new glyph. For example, the UI generator 112 may generate an interface to display the determined target fonts as suggestions to a user.

In some implementations, the process 900 includes receiving a selection of at least one target font from the user interface, replacing each missing glyph with a character corresponding to each respective new glyph, each respective new glyph being associated with the selected target font and missing from the source font, and generating at least one formatting indicator on each new glyph to indicate that the font associated with the respective missing glyph is different than the source font. For example, a user may select upon one of the suggested target fonts from the displayed user interface described herein. The selection can trigger each missing glyph to be replaced with a new glyph associated with the selected target font. The new glyph is part of the target font, but is different from the source font used on the corresponding glyph in the source document.

FIG. 10 is another example code snippet 1000 for analyzing missing glyphs using the system of FIG. 1. The code snippet 1000 may be used to recognize a document that includes missing glyphs, identify a source font associated with each respective missing glyph, extract features from the source font for each respective missing glyph, identify one or more target fonts for each respective missing glyph based the features extracted from the source font, and rank the plurality of target fonts based on a respective target font having a similarity to the plurality of features. The output of the code snippet 1000 may be used to display a user interface within the document. In the user interface, a subset of the ranked target fonts that are ranked highest and which include a character configured to replace each respective missing glyph with a new glyph may be displayed.

In some implementations, the code snippet may be executed on computing device 102 or computing device 116 to perform automated glyph replacement algorithms (e.g., to provide proper glyph representation in electronic documents). In one example of implementing such techniques, a document, selection, or text frame may be received by the systems described herein. The document, selection of text, or a selected text frame may have missing glyphs indicated in any language. A vector may be generated that includes information related to each missing glyph. For example, the vector may identify a frame number, an index number, a glyph identifier number, etc. A second vector may be generated that includes a list containing a set of applicable fonts for each missing glyph identified in first vector. The vectors may be generated by font feature extraction module 114 and/or missing glyph detection module 110.

The UI generator 112 may generate a font replacement list that identifies all applicable fonts which are able to replace at least one missing glyph amongst all missing glyphs in the document, selection, or text frame. Upon identification of the applicable fonts, the system 100 described herein can cycle through each frame in a document to find missing glyphs, as shown in the code 1000, to begin to generate a list of target fonts that are similar to a source font that authored each particular glyph in the document, selection, or text frame. To do so, the missing glyph detection module 110 may retrieve a glyph identifier of each character represented as a missing glyph, check each character for validity, and store the missing glyph index information in the first vector.

The system 100 may then search for a similar font list. For example, the systems may search to find a list of all fonts that are similar to the font of each missing glyph within a document, selection, or text frame, for example. In one example implementation, the list of similar fonts may be found using a deep learning convolutional neural network (CNN) 122.

Upon determining the list of similar fonts pertaining to all glyphs within the document, selection, or text frame, the list of similar fonts (e.g., target fonts) may be reordered based on particular properties associated with one or more missing glyphs. For example, various contextual properties including missing font style, font type, font feature similarity, etc. may be used to order the list of similar fonts. In some implementations, fonts with a similar style may be moved upward on the list because such a similarity may increase the priority of the similar font. In addition, fonts with a similar type may have more priority than fonts without a similar type to the missing glyph font. In some implementations, if a particular font in the similar font list includes a font which is already in the suggested list of target fonts 126, then that font may be prioritized ahead of other fonts to minimize the length of the list of replacement fonts.

FIG. 11 is an example code snippet 1100 for scoring fonts using the system of FIG. 1. For example, upon reordering the list of similar target fonts, the system 100 may generate a final score based on font similarity, font style, font type, and which position the font resides within the suggested list of target fonts 126. The Unicode values (e.g., UIDs) of the characters used in the missing glyphs may be obtained. The reordered list may be retrieved and each font in the list that includes the obtained UID(s) may be added to the suggested list of target fonts 126 for provision and display to a user. If a font includes a particular UID, the font may be used to properly display the glyph.

The systems and methods described herein can be used in various tools. For example, the systems and methods can be used in a portable document format scan library, photo editing software, scanning software, electronic document viewers, and electronic document analyzers and related tools.

Implementations of the described subject matter may be utilized in photo scanning libraries, photographic manipulation software, scanning software, document viewers, image recognition software, and/or scanning devices, printing devices, and/or other imaging devices associated with any or all of the above software.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method comprising:
   obtaining a document, the document including a plurality of missing glyphs;
   identifying a source font associated with each respective missing glyph,
   extracting a plurality of features pertaining to the source font for each respective missing glyph;
   identifying a plurality of target fonts for each respective missing glyph based at least in part on the plurality of features extracted from the source font;
   ranking the plurality of target fonts based on a respective target font having a similarity to the plurality of features and based on a glyph replacement score associated with each respective target font, the glyph replacement score indicating a number of the plurality of missing glyphs that a respective target font is configured to replace; and
   triggering for display in a user interface within the document and for each missing glyph in the plurality of missing glyphs, a subset of the ranked target fonts that are ranked highest and which include a character configured to replace each respective missing glyph in the document with a new glyph.

2. The method of claim 1, further comprising:
   receiving a selection of at least one target font from the user interface;
   replacing each missing glyph with a character corresponding to each respective new glyph, each respective new glyph being associated with the selected target font and missing from the source font; and
   generating at least one formatting indicator on each new glyph to indicate that the font associated with the respective missing glyph is different than the source font.

3. The method of claim 1, wherein identifying the plurality of target fonts for each respective missing glyph includes:
   accessing a repository of available fonts; and
   selecting target fonts from the repository of available fonts that are,
      configured to display at least one of the plurality of missing glyphs,
      configured to be visually similar to the source font of at least one of the plurality of missing glyphs,
      configured to match a type of at least one of the plurality of missing glyphs, and
      configured to include two or more font properties associated with at least one of the plurality of missing glyphs.

4. The method of claim 1, wherein ranking the plurality of target fonts based on a respective target font having a similarity to the plurality of features is further based on a combined score generated for each target font, the combined score including a visual similarity score, a stylistic similarity score, and a font type score.

5. The method of claim 1, wherein a target font is ranked higher in the ranked target fonts if the target font is configured to replace multiple of the plurality of missing glyphs in the document.

6. The method of claim 1, wherein the subset of the ranked target fonts includes two or more target fonts configured to replace the plurality of missing glyphs.

7. The method of claim 1, wherein generating a subset of the ranked target fonts includes:
   discarding a plurality of the ranked target fonts that are incapable of replacing the plurality of missing glyphs in the document; and
   discarding a plurality of the ranked target fonts that are dissimilar to the plurality of features extracted from the source font.

8. A computer program product embodied on a non-transitory computer-readable storage medium and comprising an introspection network and instructions that, when executed by at least one computing device, is configured to cause the at least one computing device to:
   obtain a document, the document including a plurality of missing glyphs;
   identify a source font associated with each respective missing glyph, extract a plurality of features pertaining to the source font for each respective missing glyph;

identify a plurality of target fonts for each respective missing glyph based at least in part on the plurality of features extracted from the source font;

rank the plurality of target fonts based on a respective target font having a similarity to the plurality of features and based on a glyph replacement score associated with each respective target font, the glyph replacement score indicating a number of the plurality of missing glyphs that a respective target font is configured to replace; and trigger for display in a user interface within the document and for each missing glyph in the plurality of missing glyphs, a subset of the ranked target fonts that are ranked highest and which include a character configured to replace each respective missing glyph in the document with a new glyph.

9. The computer program product of claim 8, wherein the instructions are further configured to cause the at least one computing device to:

receive a selection of at least one target font from the user interface;

replace each missing glyph with a character corresponding to each respective new glyph, each respective new glyph being associated with the selected target font and missing from the source font; and generate at least one formatting indicator on each new glyph to indicate that the font associated with the respective missing glyph is different than the source font.

10. The computer program product of claim 8, wherein identifying the plurality of target fonts for each respective missing glyph includes:

accessing a repository of available fonts; and selecting target fonts from the repository of available fonts that are, configured to display at least one of the plurality of missing glyphs, configured to be visually similar to the source font of at least one of the plurality of missing glyphs, configured to match a type of at least one of the plurality of missing glyphs, and configured to include two or more font properties associated with at least one of the plurality of missing glyphs.

11. The computer program product of claim 8, wherein ranking the plurality of target fonts based on a respective target font having a similarity to the plurality of features is further based on a combined score generated for each target font, the combined score including a visual similarity score, a stylistic similarity score, and a font type score.

12. The computer program product of claim 8, wherein a target font is ranked higher in the ranked target fonts if the target font is configured to replace multiple of the plurality of missing glyphs in the document.

13. The computer program product of claim 8, wherein the subset of the ranked target fonts includes two or more target fonts configured to replace the plurality of missing glyphs.

14. The computer program product of claim 8, wherein generating a subset of the ranked target fonts includes:

discarding a plurality of the ranked target fonts that are incapable of replacing the plurality of missing glyphs in the document; and discarding a plurality of the ranked target fonts that are dissimilar to the plurality of features extracted from the source font.

15. A system comprising:

at least one memory including instructions; and at least one processor that is operably coupled to the at least one memory and that is arranged and configured to execute instructions that, when executed, cause the at least one processor to:

receive at least one document including a plurality of missing glyphs;

in response to receiving the at least one document, automatically, identify a source font associated with each respective missing glyph, extract a plurality of features pertaining to the source font for each respective missing glyph;

identify a plurality of target fonts for each respective missing glyph based at least in part on the plurality of features extracted from the source font;

rank the plurality of target fonts based on a respective target font having a similarity to the plurality of features and based on a glyph replacement score associated with each respective target font, the glyph replacement score indicating a number of the plurality of missing glyphs that a respective target font is configured to replace; and trigger for display in a user interface within the document and for each missing glyph in the plurality of missing glyphs, a subset of the ranked target fonts that are ranked highest and which include a character configured to replace each respective missing glyph in the document with a new glyph.

16. The system of claim 15, wherein the instructions are further configured to cause the at least one processor to:

receive a selection of at least one target font from the user interface;

replace each missing glyph with a character corresponding to each respective new glyph, each respective new glyph being associated with the selected target font and missing from the source font; and generate at least one formatting indicator on each new glyph to indicate that the font associated with the respective missing glyph is different than the source font.

17. The system of claim 15, wherein identifying the plurality of target fonts for each respective missing glyph includes:

accessing a repository of available fonts; and selecting target fonts from the repository of available fonts that are, configured to display at least one of the plurality of missing glyphs, configured to be visually similar to the source font of at least one of the plurality of missing glyphs, configured to match a type of at least one of the plurality of missing glyphs, and configured to include two or more font properties associated with at least one of the plurality of missing glyphs.

18. The system of claim 15, wherein ranking the plurality of target fonts based on a respective target font having a similarity to the plurality of features is further based on a combined score generated for each target font, the combined score including a visual similarity score, a stylistic similarity score, a font type score.

19. The system of claim 15, wherein a target font is ranked higher in the ranked target fonts if the target font is configured to replace multiple of the plurality of missing glyphs in the document.

20. The system of claim 15, wherein generating a subset of the ranked target fonts includes:
- discarding a plurality of the ranked target fonts that are incapable of replacing the plurality of missing glyphs in the document; and
- discarding a plurality of the ranked target fonts that are dissimilar to the plurality of features extracted from the source font.

* * * * *